(12) United States Patent
Riga

(10) Patent No.: US 7,107,222 B1
(45) Date of Patent: Sep. 12, 2006

(54) DEATH CARE MERCHANDISING SYSTEM

(75) Inventor: Dennis J. Riga, New Albany, OH (US)

(73) Assignee: Matthews Resources, Inc., Wilmington, DE (US)

( * ) Notice: Subject to any disclaimer, the term of this patent is extended or adjusted under 35 U.S.C. 154(b) by 695 days.

(21) Appl. No.: 09/698,474

(22) Filed: Oct. 30, 2000

Related U.S. Application Data

(60) Provisional application No. 60/162,149, filed on Oct. 29, 1999.

(51) Int. Cl.
*G06F 17/60* (2006.01)

(52) U.S. Cl. ........................................ 705/1; 211/85.16

(58) Field of Classification Search ............... 27/2, 27/27, 19; 211/85.16; 705/1, 5, 6, 8, 9, 705/35, 36, 16
See application file for complete search history.

(56) References Cited

U.S. PATENT DOCUMENTS

| | | | |
|---|---|---|---|
| 5,755,343 A | | 5/1998 | Harvey, Sr. |
| 5,901,862 A | * | 5/1999 | Riga et al. ............... 211/85.16 |
| 5,956,825 A | * | 9/1999 | McCoy et al. ................... 27/2 |
| 5,960,966 A | * | 10/1999 | Riga et al. ............... 211/85.16 |
| 6,073,320 A | * | 6/2000 | Salatin et al. ................... 27/27 |
| 6,105,793 A | * | 8/2000 | Riga et al. ............... 211/85.16 |
| 6,161,705 A | * | 12/2000 | Riga et al. ............... 211/85.16 |
| 6,276,034 B1 | * | 8/2001 | Bachman et al. ............... 27/27 |
| 6,681,510 B1 | | 1/2004 | Salatin et al. |

FOREIGN PATENT DOCUMENTS

JP 02004272720 A * 9/2004

* cited by examiner

*Primary Examiner*—Elisca Pierre Eddy
(74) *Attorney, Agent, or Firm*—Reed Smith LLP

(57) ABSTRACT

The invention generally relates to the merchandising of death care products and death care related products, such as caskets, coffins, vaults, bronzes and other metallic adornments, personalized exteriors and interiors of caskets and coffins, urns, keepsakes and various printed materials, including, but not limited to, cards, such as sympathy cards, stationery, and other printed literature, including pamphlets, books, whether recorded on paper or in other formats, e.g., videotape or film, CD, DVD or other electronic media, etc. The invention also provides a method, apparatus and display fixtures to inform and educate patrons who are making arrangements in advance of actual need, as well as families and relatives of those who may be making arrangements for a recently deceased family member.

19 Claims, 20 Drawing Sheets

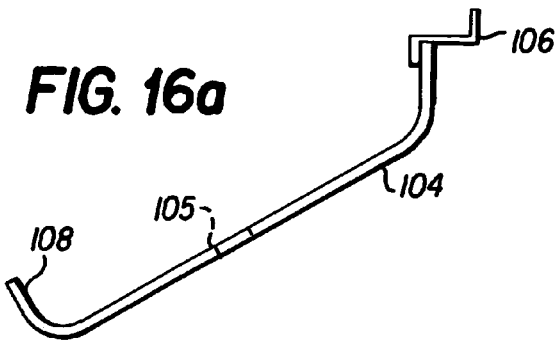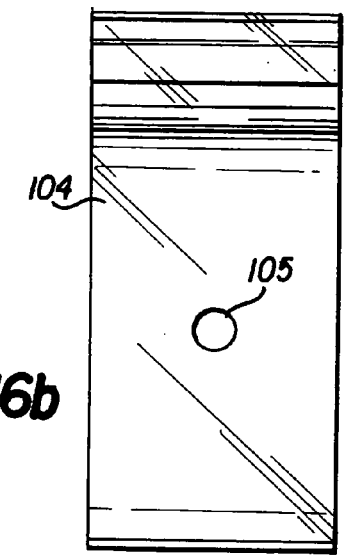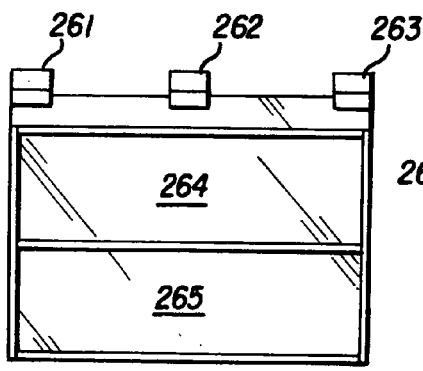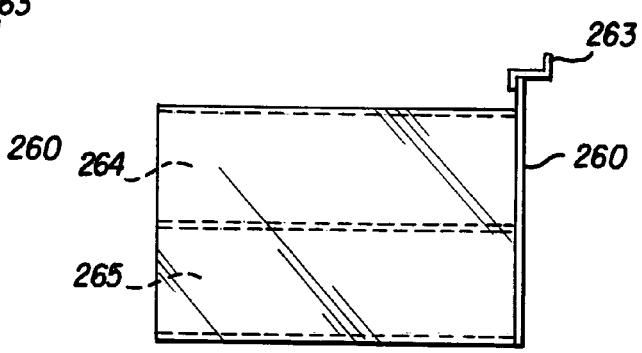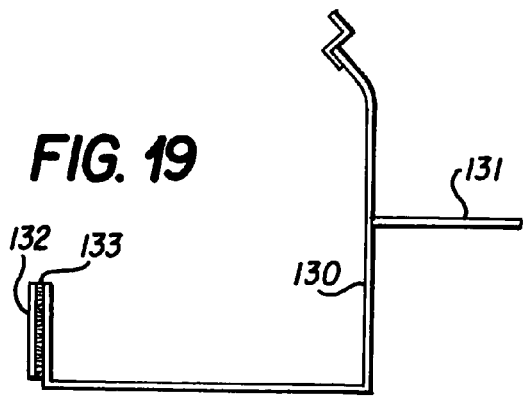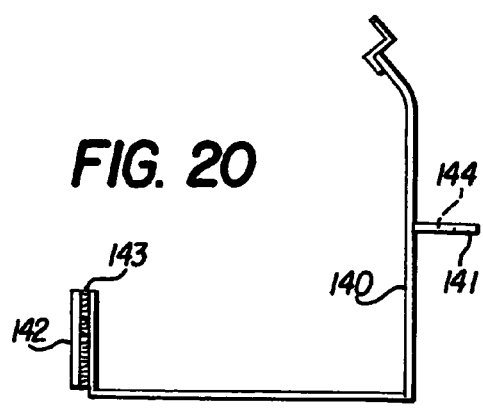

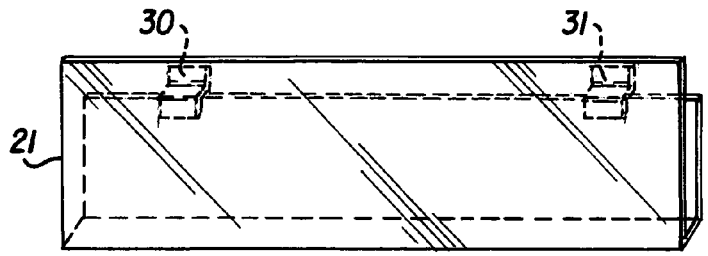
FIG. 21
FIG. 22a
FIG. 22b
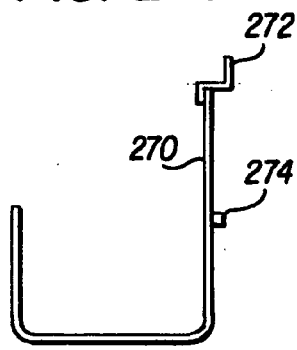
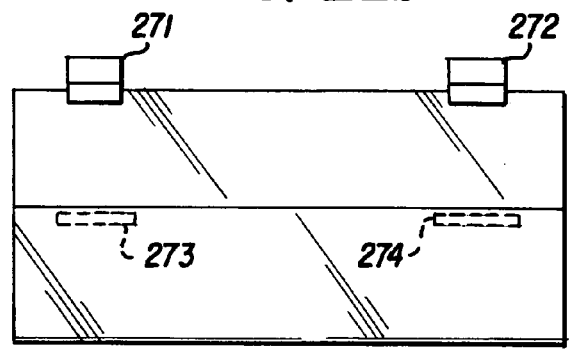
FIG. 23a
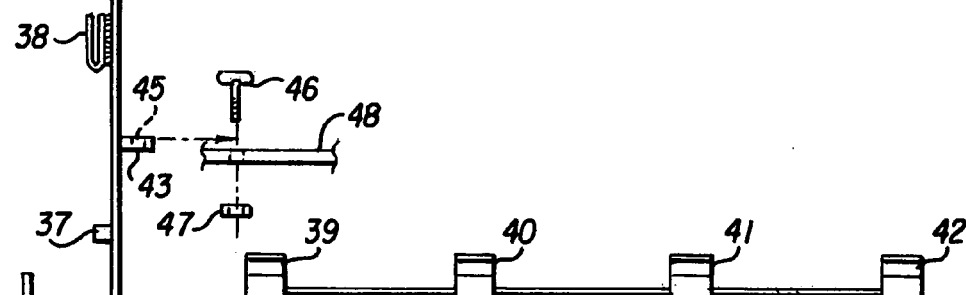
FIG. 23b
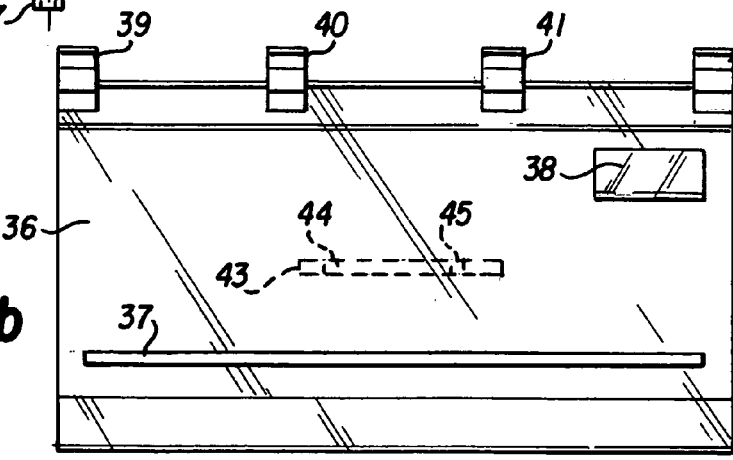

DEATH CARE MERCHANDISING SYSTEM

CROSS REFERENCES TO RELATED APPLICATIONS

This application claims the benefit of U.S. Provisional Application No. 60/162,149 filed Oct. 29, 1999.

BACKGROUND OF THE INVENTION

1. Field of the Invention

The invention generally relates to the merchandising of death care products and death care related products, such as caskets, coffins, vaults, bronzes and other metallic adornments, personalized exteriors and interiors of caskets and coffins, urns, keepsakes and various printed materials, including, but not limited to, cards, such as sympathy cards, stationery, and other printed literature, including pamphlets, books, whether recorded on paper or in other formats, e.g., videotape or film, CD, DVD or other electronic media, etc. The invention also provides a method, apparatus and display fixtures to inform and educate patrons who are making arrangements in advance of actual need, as well as families and relatives of those who may be making arrangements for a recently deceased family member.

2. Background of the Invention

The conventional display of death care merchandise, such as coffins and caskets, historically has been to invite the customer into a room in which various full size caskets are gathered. The gathered caskets generally do not have any rationale to the arrangement of the caskets nor are they even oriented in a meaningful matter. Generally, both horizontal and vertically arranged caskets are gathered in a room or warehouse adjacent the funeral home. However, the space available at funeral homes or the need to visit a warehouse remote from the funeral home has meant that the selection of death care merchandise which is necessarily limited by the physical size of the available rooms or warehouse. On the other hand, another approach to merchandising coffins or caskets has been to provide an album or collection of photographic or pictorial representations of coffins and caskets, coupled with a limited number of samples on the premises of the funeral home. Neither of these prior art arrangements have been satisfactory for providing the quality and quantity of information necessary for the prospective purchaser of death care items, such as caskets and coffins, to make informed decisions.

In addition, the prior art manner of merchandising death care products, such as coffins and caskets, did not lead one to effectively merchandise related death care products, such as vaults, urns, bronzes and other metallic plaques, ornamentation, etc., paper products, such as sympathy cards, stationery, books and other printed literature, keepsakes, nor to provide a way to personalize the funeral service.

Thus, there remains a need for improving the merchandising of death care merchandise, such as coffins and caskets, as well as presenting those patrons with either immediate need or pre-need, information, education, and choices in purchasing death care products.

The present invention satisfies these and other needs, which can be better understood by reference to the accompanying drawings and the following description.

SUMMARY OF THE INVENTION

The invention provides a death care merchandising system, a method of death care merchandising and related apparatus for improving the information and education available to those patrons having to purchase death care merchandise.

BRIEF DESCRIPTION OF THE DRAWINGS

FIGS. 5a and 5b are enlarged views of a literature section arranged to display pamphlets, audio cassettes, CDs and other information, whereas FIG. 5b illustrates a collection of printed material in the form of books;

FIG. 15b is a bookend slidably fitted within the structure of FIG. 15a;

FIGS. 16a and 16b illustrate another novel shelving unit for displaying emblems (FIG. 16a is a side view and FIG. 16b is a front view of such shelving unit);

FIGS. 18a and 18b are, respectively, a front and side view of another novel shelving unit in which displays such as the interior casket linings are insertable and viewable through the transparent apertures illustrated in apertures 18a and 18b;

FIG. 19 is another novel display shelf for presenting items at an angle relative to the module merchandising display system, wherein the angle is dictated by the length of the protrusion extending from the rear of FIG. 19;

FIG. 20 is a module similar in function to that of FIG. 19, but wherein the aperture extending from the rear of FIG. 20 is adapted to fixedly, but removably, accept protrusions of any length so as to change the angle through a wide range of degrees;

FIG. 21 is a schematic, partially perspective view of a card holder;

FIGS. 22a and 22b show, respectively, a side and front view of another display shelf according to the invention;

FIGS. 23a and 23b are, respectively, side and front views of another angled display shelf, which may be fixedly, but removably, fitted with protrusions changing the angle of orientation of the shelf through a number of degrees;

DETAILED DESCRIPTION OF THE PREFERRED EMBODIMENTS

Figure 1:
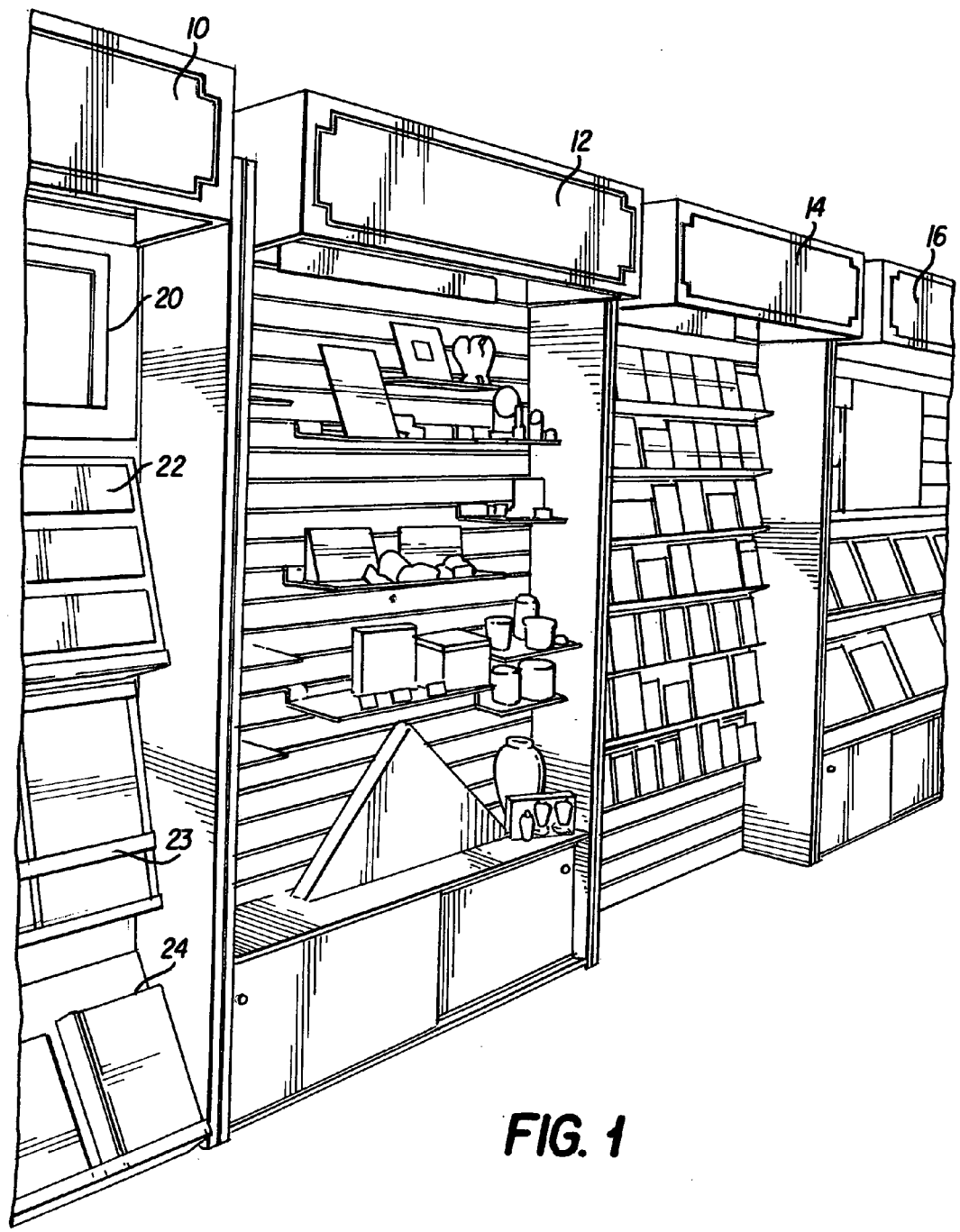
FIG. 1 is a perspective view of a portion of a death care merchandising system illustrating, for example, from left to right, a display of bronzes and other metallic memorials, a display of keepsakes or personalized gifts, a display of cards, such as sympathy cards, and an informative display of literature for event planning.
Figure 2:
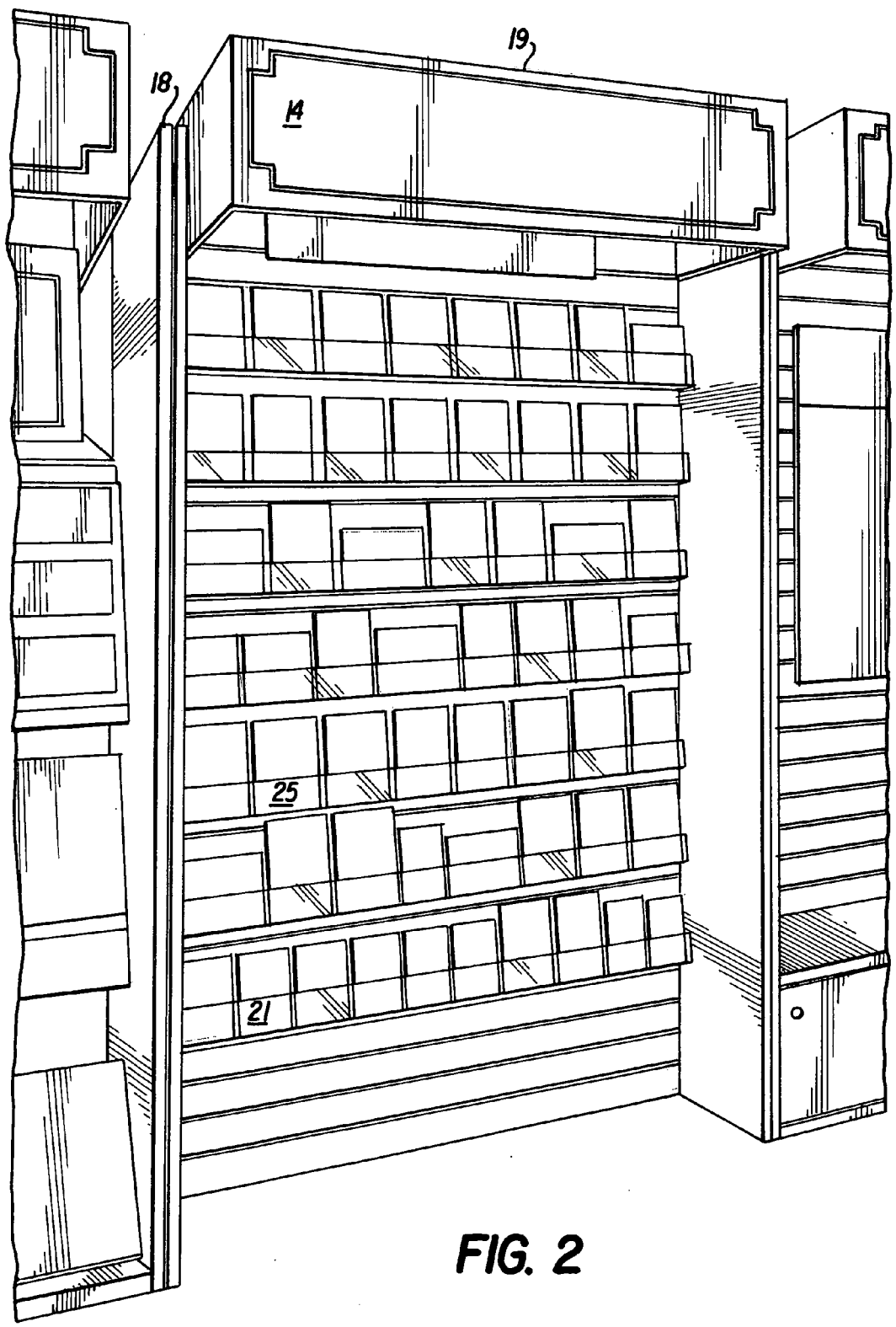
FIG. 2 is an enlarged view of the sympathy portion of FIG. 1.

As can be seen from the accompanying figures, a novel death care merchandising system has been designed so as to educate and inform prospective purchasers of items that should be considered during any funeral service. As shown in FIG. 1, which is only a portion of the merchandising system according to the present invention, modules 10, 12, 14 and 16 are illustrated in which various death care merchandise are displayed. For example, in module 10, several bronze items 20, 22, 23 and 24 are displayed in which item 20, which is normally above the eyesight of the viewer is tilted slightly toward the viewer from the top, whereas items 22, 23 and 24, which are generally below the eyesight of the viewer are angled outwardly away from the display. In module 12, various personalized gifts or keepsakes are displayed which may be of interest to the customer for presenting to friends, family members and other mourners prior to, at, or subsequent to the funeral or memorial service itself. Module 14 illustrates printed materials, such as sympathy cards, while module 16 displays other printed literature. FIG. 2 shows module 14 in enlarged view, wherein the back portion of module 14 is formed of a slat wall 15 and two opposing wing walls 17 and 18, respectively. Module 14 may be provided with a cornice 19, which cornice may contain lights (not shown) for purposes of providing illumination to the display of cards. A series of similar card holders 21, 25, etc. are provided. The card holder 21 (best shown in FIG. 21) comprises a generally "U" shaped portion where the legs of the "U" are of unequal height. The rear leg of the "U" (as illustrated in FIG. 21) is provided with a pair of brackets 30, 31 for engaging with the slat wall 15 of module 14. The shelving unit 21 is preferably made of a transparent material, such as a polymer, most preferably an acrylic or other high transparency polymeric material of low gloss so as not to detract from the card being displayed within shelf 21.

Figure 3:
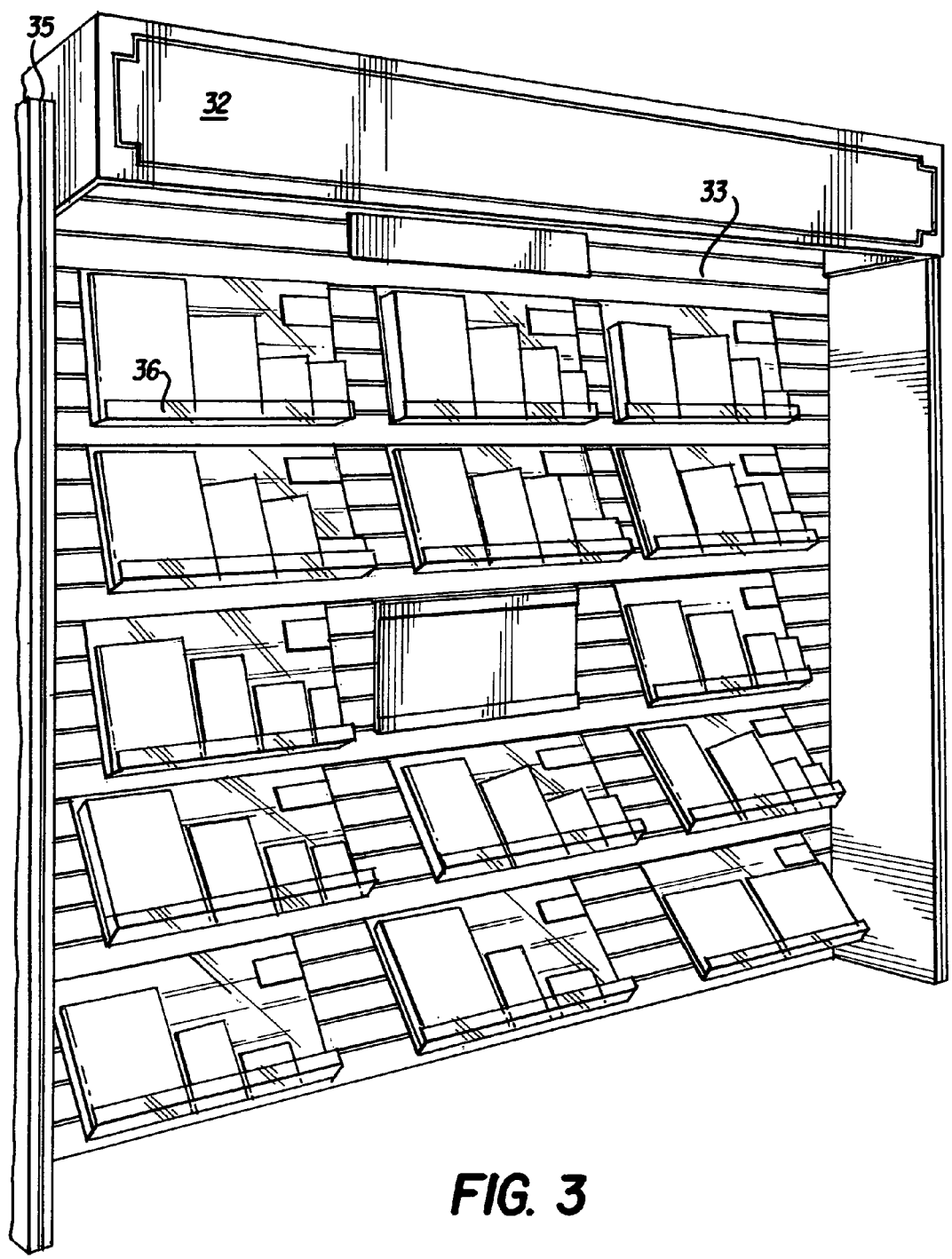
FIG. 3 is an enlarged view of the stationery portion of FIG. 1.

FIG. 3 is illustrative a module 32 for displaying stationary and is comprised of a slat wall 33 and two wing walls 34 and 35. A plurality of shelves for angularly displaying various stationery is shown, generally at 36 and in the enlarged view of FIGS. 23a and 23b. As can be best seen from FIGS. 23a and 23b, shelves 36 contain a label holder 38 for providing information concerning the product on the shelf 36, as well as being provided with an elongated element 37, which may be used for various purposes, for holding, open or closed, cards, stationery and other paper products placed within shelving unit 36. A plurality of angled elements 39, 40, 41 and 42 can be used to support the weight and attach shelf 36 to the rear slat wall 33 of module 32. Protruding from the rear of shelf 36 is protrusion 43, which is fixedly attached to the rear of shelf 36 as by gluing, heat fusion, etc. Element 43 can be of any length, but preferably is only large enough to permit the formation as by drilling, molding, etc. of two through holes 44, 45 so as to accept a fastener such as elements 46 and 47 to attach a plate 48 to protrusion 43. The length of plate 48 is variable so as to change the angular orientation of shelf 36 relative to slat wall 33. The use of elements 48, together with its associated hardware to change the angular orientation can be used with most of the shelving units illustrated in the invention, although it should be expressly understood that fixed elements of any length, such as those shown in FIG. 19 could be provided as an alternative.

Figure 4:
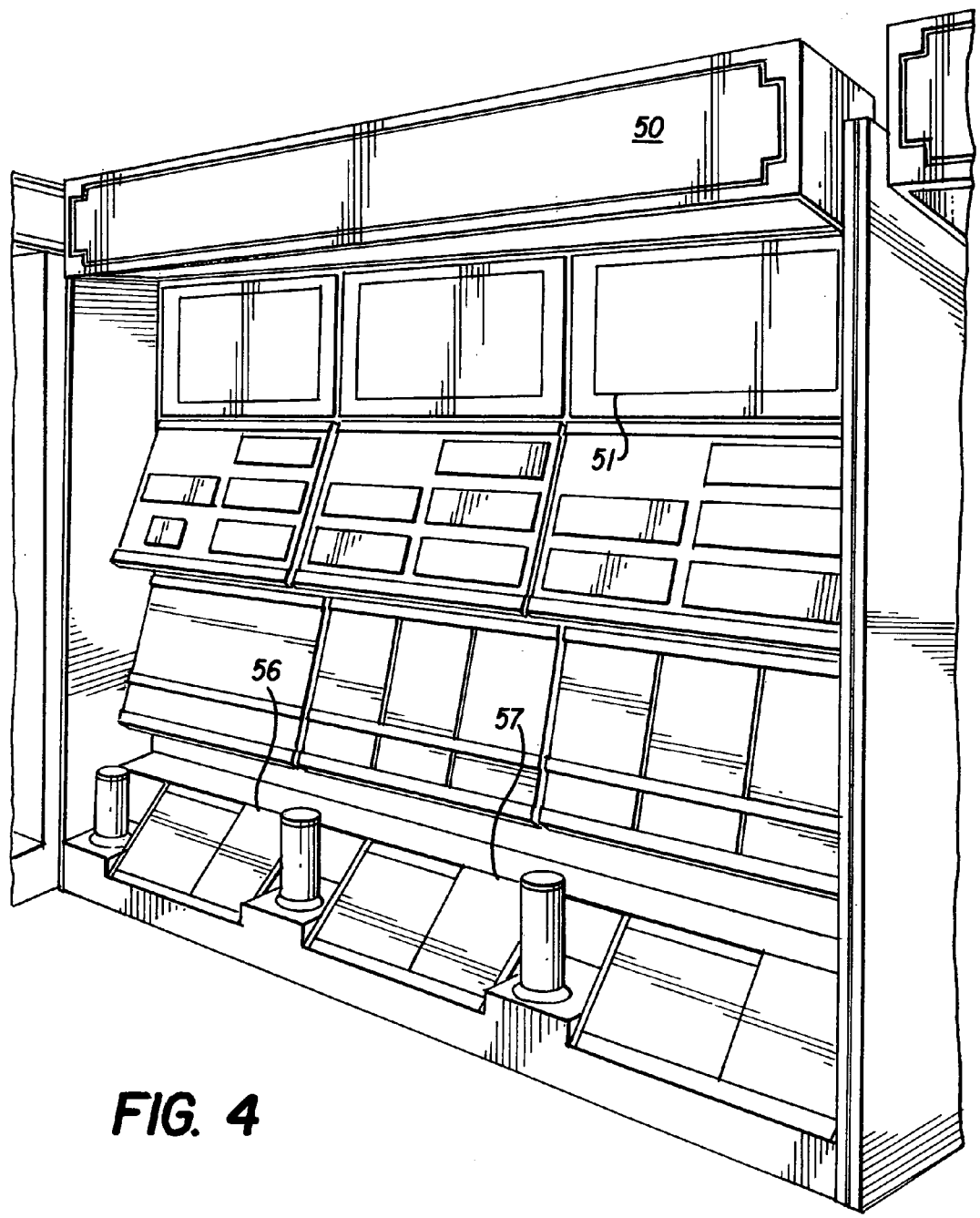
FIG. 4 is an enlarged view of the bronze section of FIG. 1.

FIG. 4 illustrates a death care merchandising module 50 for displaying a plurality of items, such as bronze plaques or other metallic castings, including vases, etc. An upper row of plaques 51 can be set parallel to slat wall 52 or, alternatively, angled slightly toward the viewer. The bronzes may differ from each other in quality, detail, surface finish, etc. so as to present a "good," "better," and "best" selection to the customer. Similarly, "good," "better," and "best" quality, as well as color selections can be found on the second and third shelving units of this display. On the lower or floor section of module 50 can be displayed vases or flower holders 53, 54 and 55, together with associated castings 56, 57 and 58, respectively.

Figure 5A:
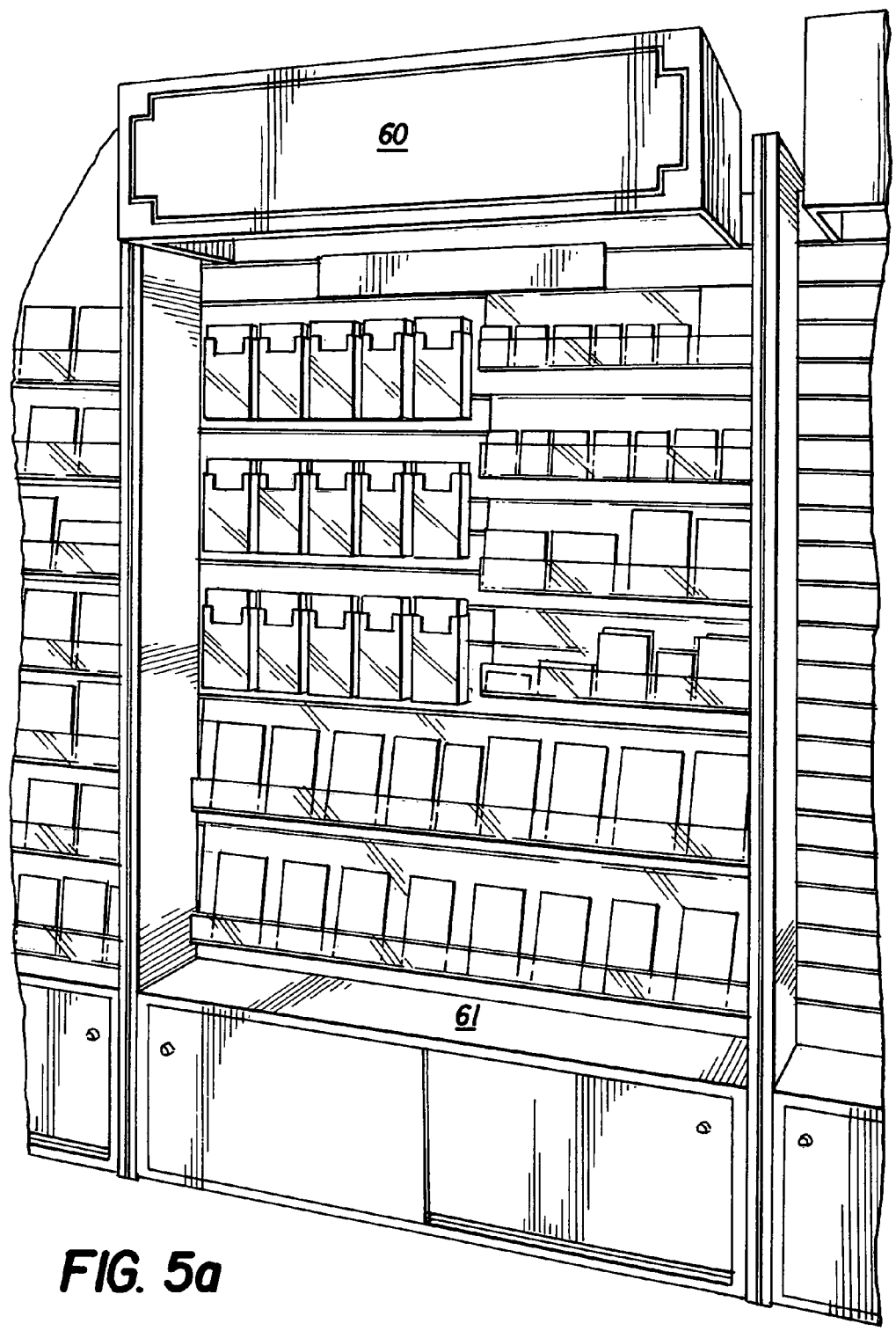
Figure 5B:
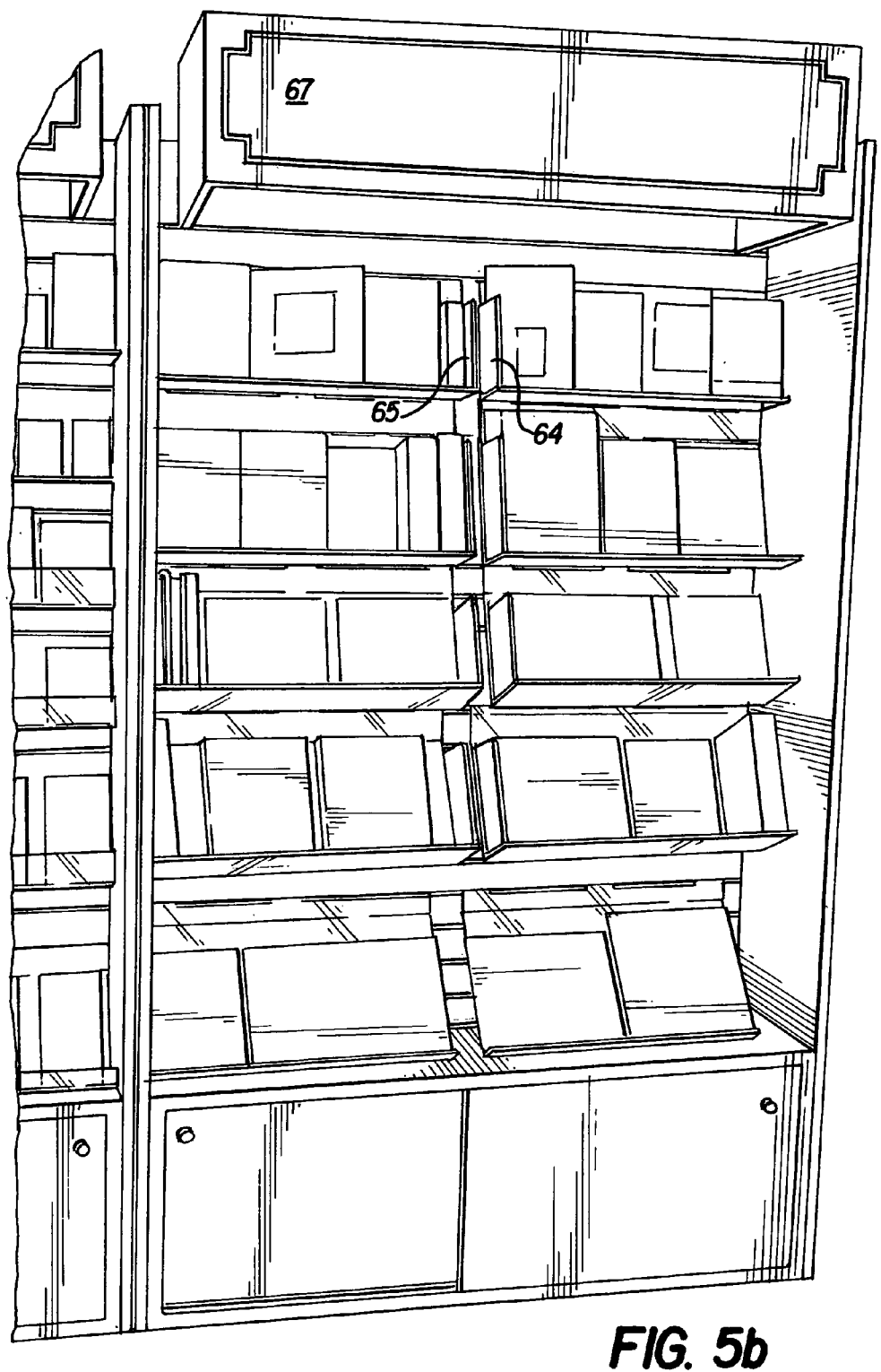
Figure 15A:
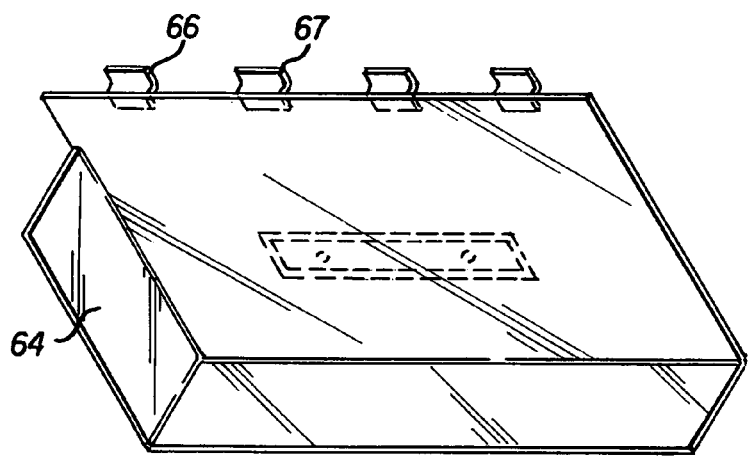
FIG. 15a illustrates a novel shelving unit for displaying literature, such as books.
Figure 15B:
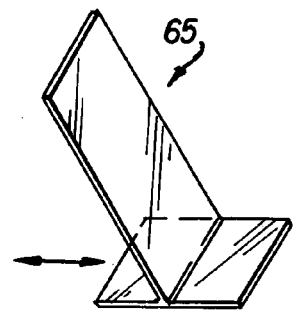

FIGS. 5a and 5b illustrate, respectively, modules for the purpose of displaying printed work, such as literature, pamphlets, books, video or audio tapes, CD, DVD and other electronic media, cards, and other printed matter, which can be arranged under the subject matter of understanding grief or inspiration and other literary classifications. As shown in FIGS. 5a and 5b, each of the modules 60 and 62 is provided with a combination cabinet/shelving unit 61, 63, respectively, the purpose of which is to provide storage area for additional or other printed matter as to be displayed in their respective modules. As can best be seen in FIG. 5b is provided a shelving unit 64 for the purpose of displaying books. Shelving unit 64 may optionally be provided with a book end section 65, details of which are shown in FIGS. 15a and 15b. Similar to the other shelving units previously discussed, shelving unit 64 is provided with a series of angular brackets 66, 67, etc., which may be attached to the rear wall of shelving unit 64. When shelving unit 64 is made of a transparent material, such as an acrylic resin, bracket 66, 67 may be attached in various manners known to the art, such as by the use of adhesive, solvent welding, heat welding, friction welding, etc. Shelving unit 64 is provided with a protrusion at its rear wall, the purpose of which has been discussed with regard to FIG. 23a so as to change or alter the angular orientation of the shelving unit 15a with regard to slat wall 68 of death care merchandise display unit 62.

Figure 6:
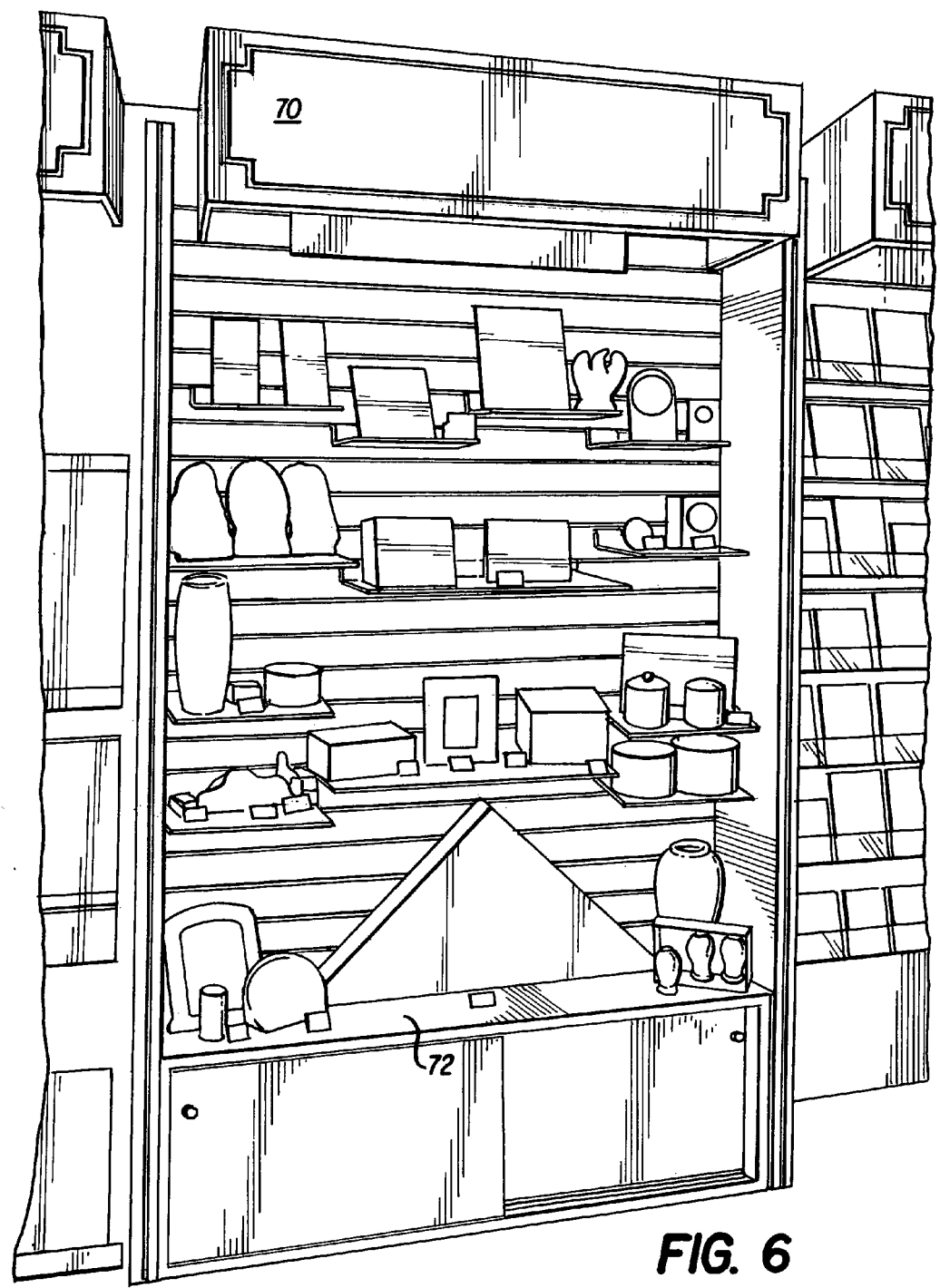
FIG. 6 is an enlarged view of the keepsakes portion of FIG. 1.

FIG. 6 illustrates a personalized gift or "keepsakes" display module 70. This module 70 is provided with a lower cabinet/shelving unit 72, the purpose of which is to store additional items or other inventory so as to be displayed within module unit 70. As can be seen from FIG. 6, the gifts may take various forms, including ceramics, glass, photo frames, flags, etc.

Figure 7:
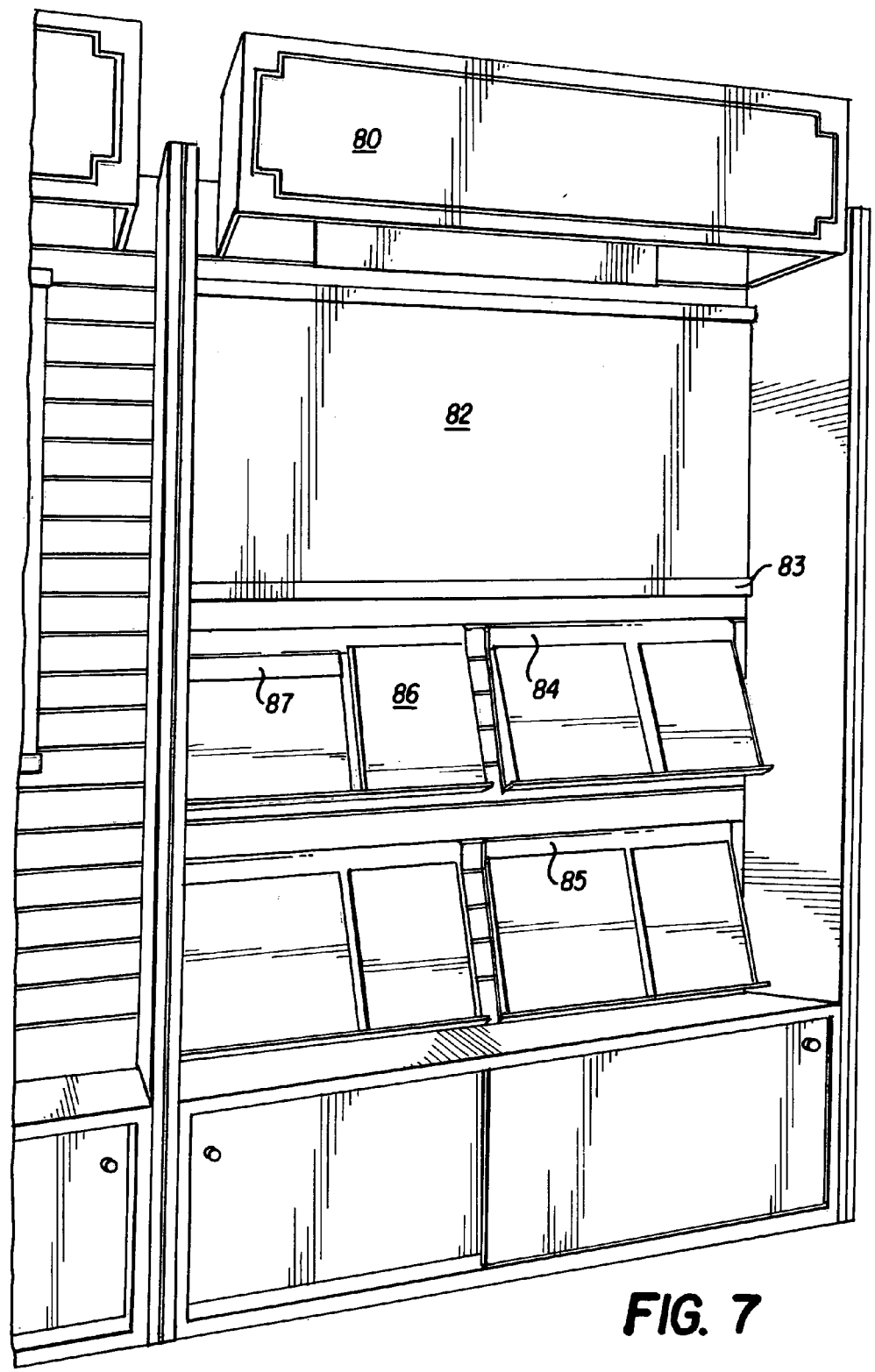
FIG. 7 is an enlarged view of the event planning portion of FIG. 1.
Figure 8:
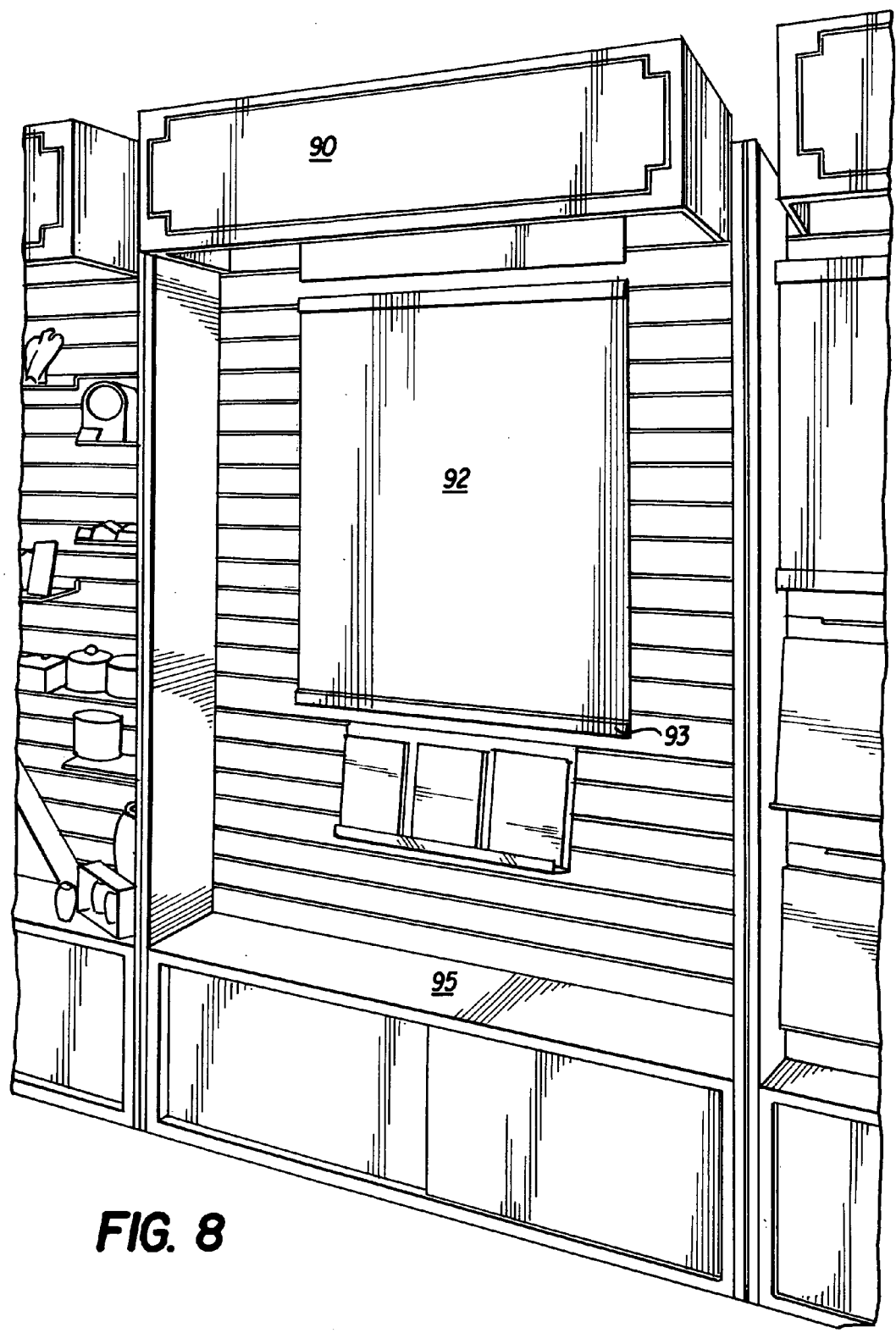
FIG. 8 is an enlarged view of the pre-need segment of a merchandising system.
Figure 9A:
FIGS. 9a and 9b illustrate a personalized exterior (FIG. 9a) and an enlarged module for personalized exteriors (FIG. 9b), including further options for personalizing the funeral event.
Figure 9B:
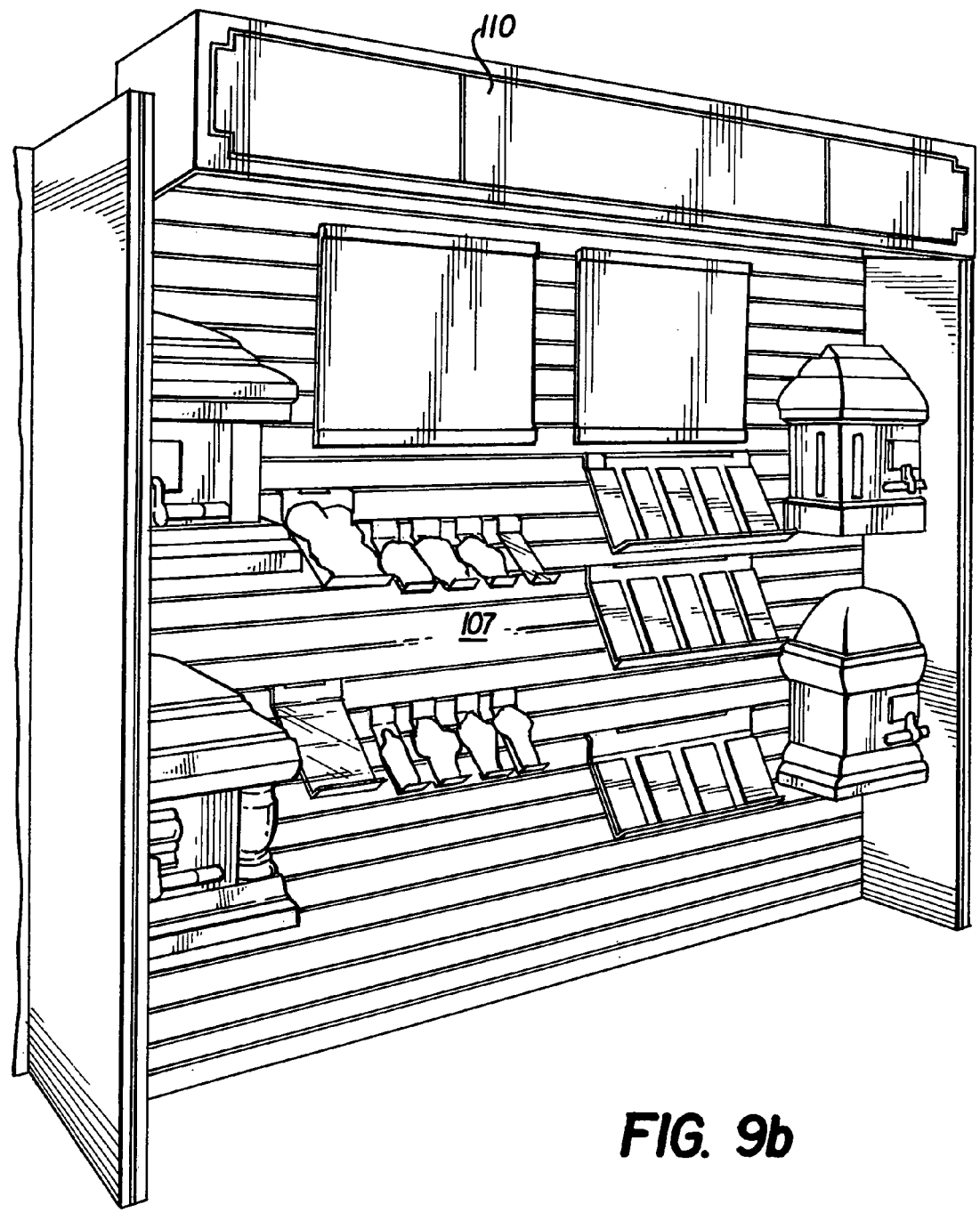
Figure 11:
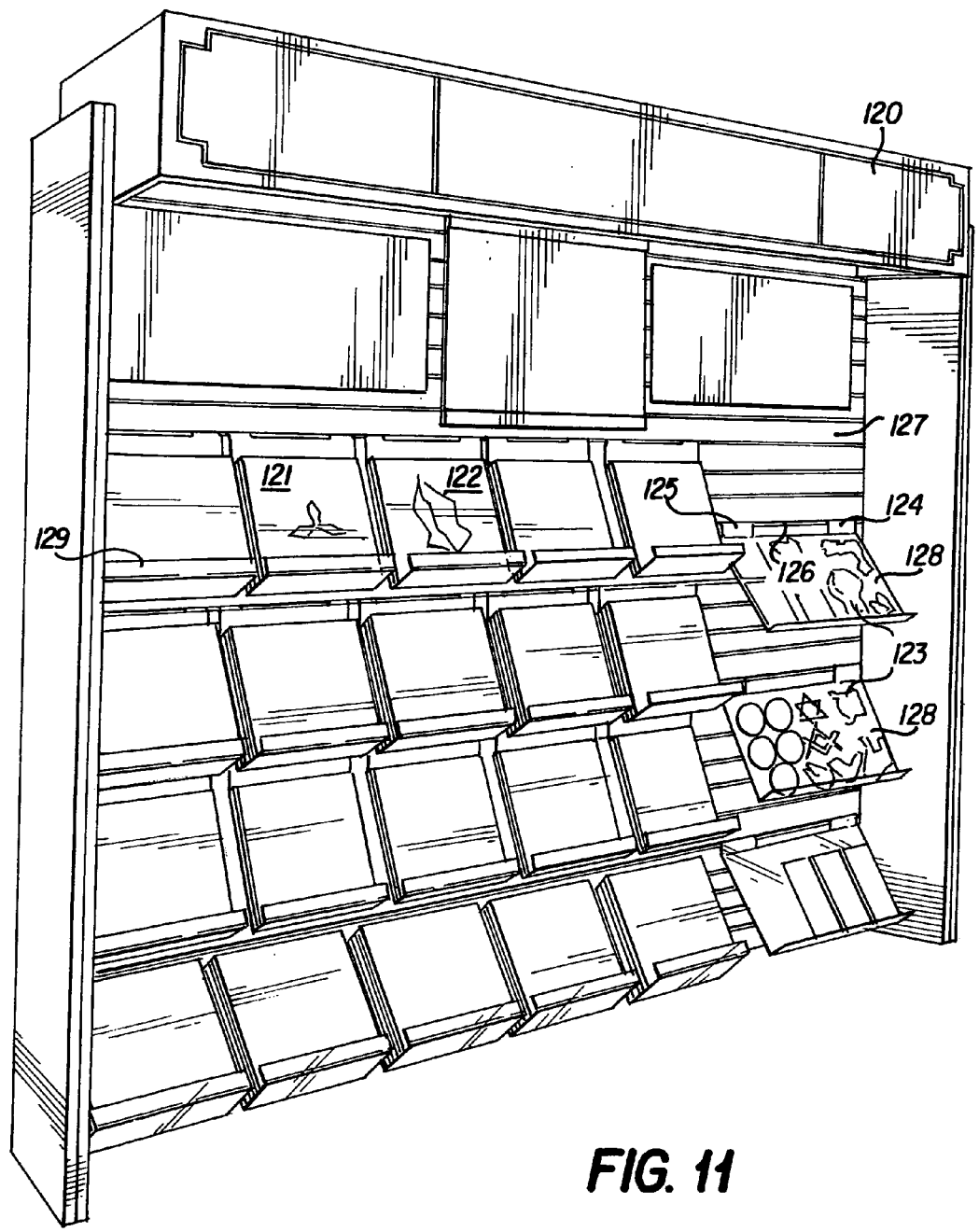
FIG. 11 is a perspective view of a merchandising module for personalized interiors (of coffins or caskets)
Figure 25:
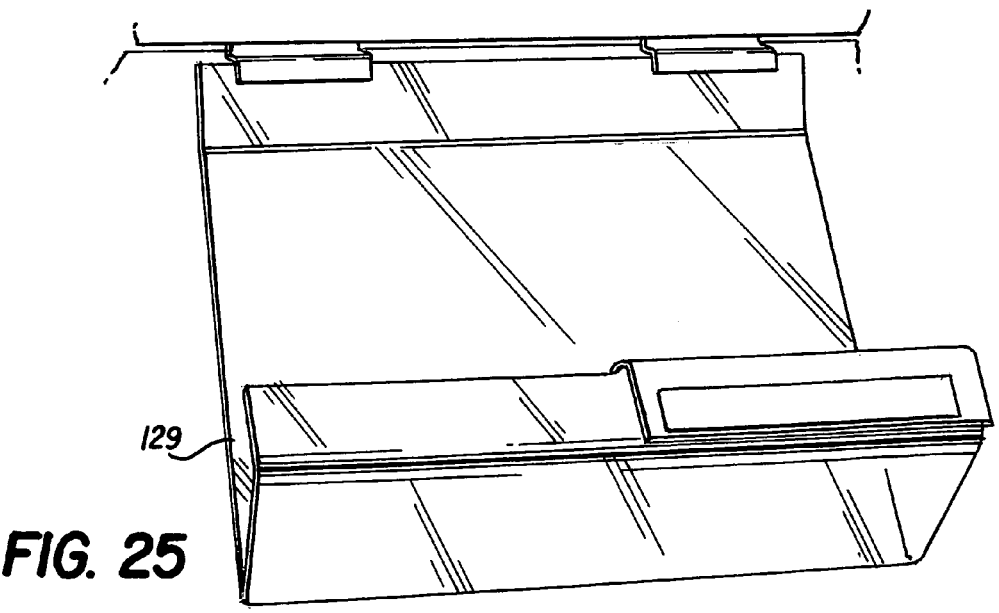
FIG. 25 is an enlarged view of the shelves of FIG. 11.

FIG. 7 is a new type of module in which information and not merchandise is displayed so that a funeral event can be planned in advance by prearranging the funeral or memorial service. FIG. 7 illustrates a module 80 containing printed material 82 in the form of a literature holder 83, as well as several shelving units 84, 85, etc. Shelving units 84, 85, etc.

are designed so as to illustrate both a book or brochure of alternatives 86, as well as providing a visual printed or photographic option 87. FIG. 8 is similar in providing information module 90, which contains printed literature 92 and a literature holder 93 attached to slat wall 94. As in FIG. 7, a lower cabinet 95 may be provided, the purpose of which is to store additional copies or other literature to be used in module 90. FIGS. 9*a* and 9*b* illustrate smaller and larger versions of modules 100, 110, respectively, for personalizing the exterior of coffins or caskets. As shown, for example, in module 100, two sectionalized caskets 101, 102 are mounted upon slat wall 103. As can be seen in emblem holders 104, 105, etc., various emblems can be used to personalize the exterior (or interior) of the casket. The various choices of emblems 106, 107 or 108 are casket corners, such as 109, can be displayed adjacent to sectional caskets. In this manner of display, the customer may clearly visualize the varying effects of a change of the emblem or casket corner as far as contrasting or complimenting the selected caskets. For the purpose of displaying such emblems and casket corners, I have devised new shelving units 104 best shown in FIGS. 16*a* and 16*b*, wherein 16*a* shows a side view, including an aperture 105 of shelf 104, which is provided with an angular bracket 106, so as to permit attachment of shelf 104 to slat wall 107 of module 100 (or 110). The aperture 105 is to receive a protrusion from the rear surface of the emblem or casket corner so as to orient the emblem on the shelf. A lower protruding flange 108 also can be utilized to assist in presentation of the emblem or casket corner to the patron. In a still further embodiment as shown in FIG. 11, a module 120 can be provided so as to illustrate personal interiors, such as embroidered or printed fabrics 121, 122, etc. on shelves 129 (shown in enlargement of FIG. 25) or interior emblems 123 designed to be placed on the cover of the open casket. For purposes of facilitating display of these items, I have provided novel shelving units in the form of a carpet containing shelf 124. This shelf, made of a polymer material, is provided with a plurality of brackets 125, 126 for attachment to the slat wall 127 of module 120. The rear portion of emblems 123 are provided with a hook and loop backing, such as that sold under the trademark "VELCRO," such that the emblems hook the pile of carpet 128 on the shelf so as to secure the emblem 123 on carpet 128.

Figure 12:
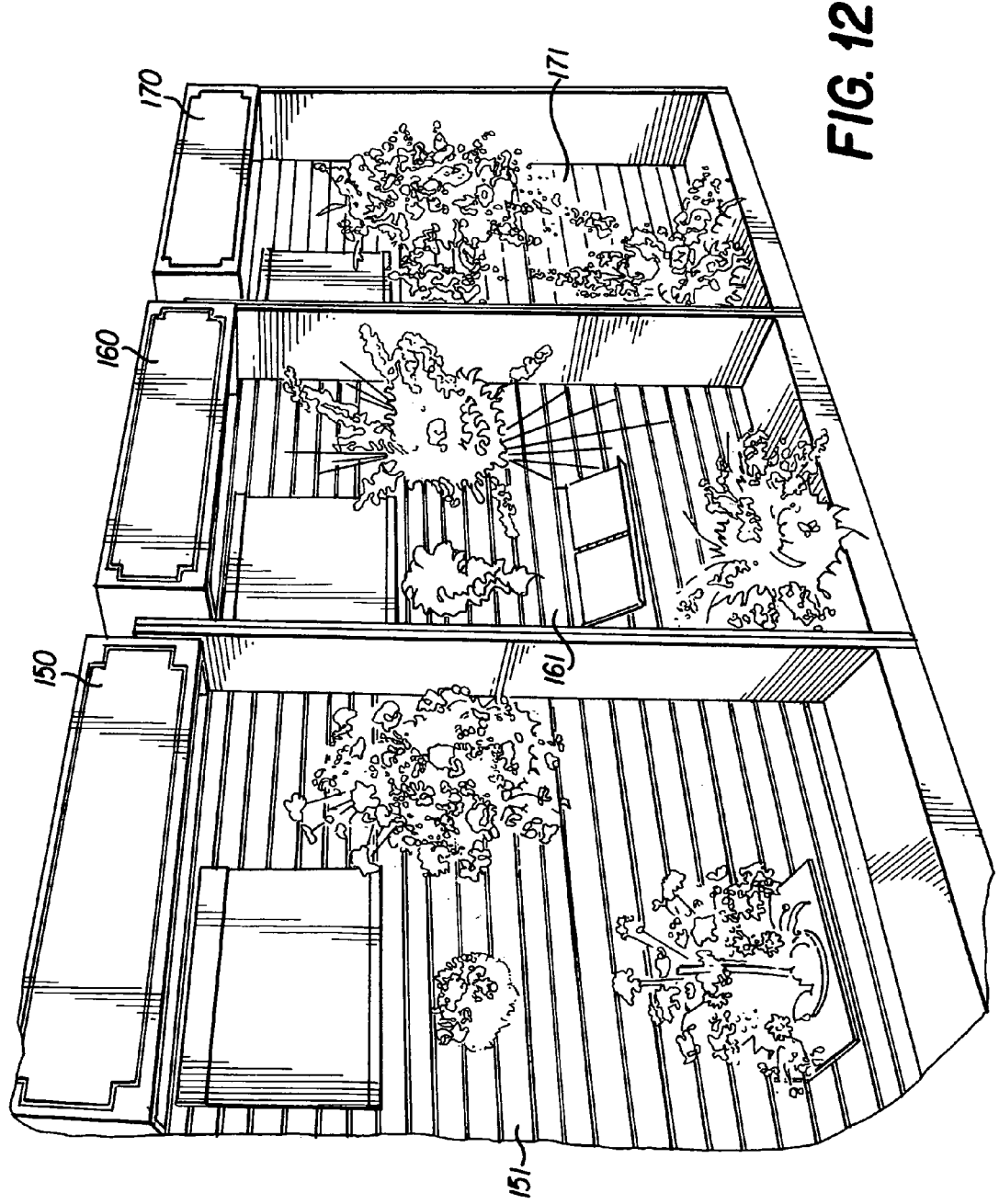
FIG. 12 illustrates in perspective view three associated death care merchandising modules that are displaying flower arrangements for funerals.

In another embodiment, personalized interior fabrics 121, 122, etc. may be provided in shelves as shown in FIGS. 19 and 20. Such shelves 130 or 140 differ only in the length of protrusion 131, 141 extending from the rear of the shelf unit. The front of shelf units 130 may be provided with a label holder 132 in a manner similar to that provided on shelf unit 140 in FIG. 20, as label holder 142. The label holders 132 and 142 are made of a transparent polymeric material, suitably an acrylic, which may be attached via an adhesive 133, 143, respectively, to shelf 130 or 140. In FIG. 20, is provided a rearward protrusion 141 having a series of apertures 144, the purpose of which is to fixedly, but removably, attach protrusions of different length (as in FIG. 23*a*) so as to change the angular orientation of the shelving unit relative to the slat wall 127. In FIG. 12 are displayed a plurality of module units 150, 160 and 170, each comprising a slat wall back 151, 161, 171, respectively, on which floral arrangements and information may be displayed. As can be seen from the different arrangements in each of modules 150, 160 and 170, the arrangements are not limited except by the skill and imagination of the flower arranger.

Figure 17A:
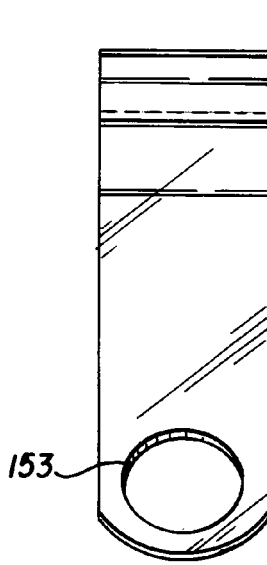
FIGS. 17a and 17b are, respectively, a front and side view of another novel shelving unit having an aperture in which the stems of a flower arrangement or a vase may be inserted so as to display the floral arrangement.
Figure 17B:
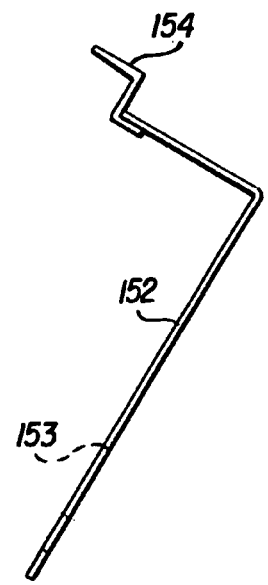
Figure 24:
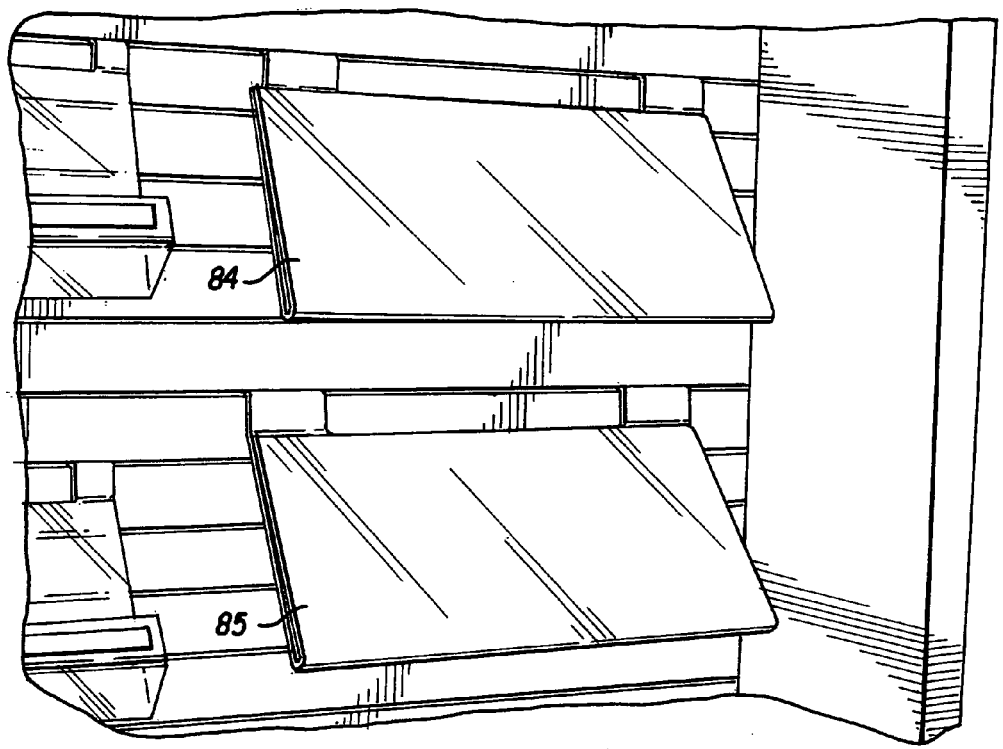
FIG. 24 is an enlarged view of the shelves of FIG. 7.

For purposes of displaying the floral arrangements, I have provided a new shelving bracket illustrated at 152 in FIGS. 17A and 17B. As clearly shown in FIG. 17*a*, shelving unit defines an aperture 153 extending completely through the thickness so as to receive a vase, individual or arrangements of, stems of flowers. The shelving unit is provided at its upper end with an angled bracket 154 to engage with slat wall 151. It should be recognized that although the bracket remains partially or completely hidden, it may be made of a polymeric material, suitably a transparent material, most suitably an acrylic resin containing material, so as to provide the aesthetic and structure properties necessary to display the flower arrangement.

Figure 13:
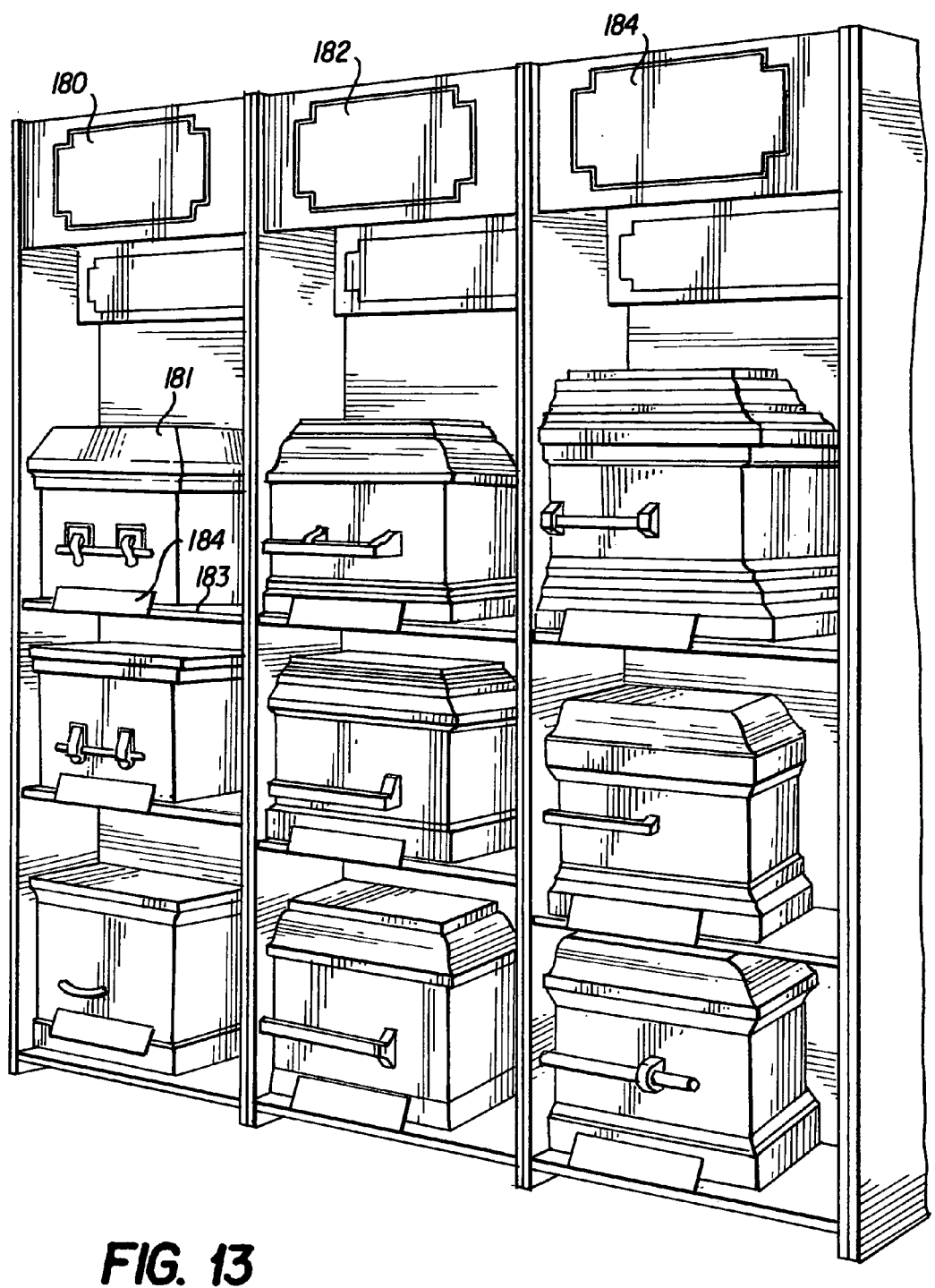
FIG. 13 is a perspective view of partially sectioned cremation caskets in adjacent modules for cardboard, fiberwood and hardwood caskets, respectively.
Figure 14:
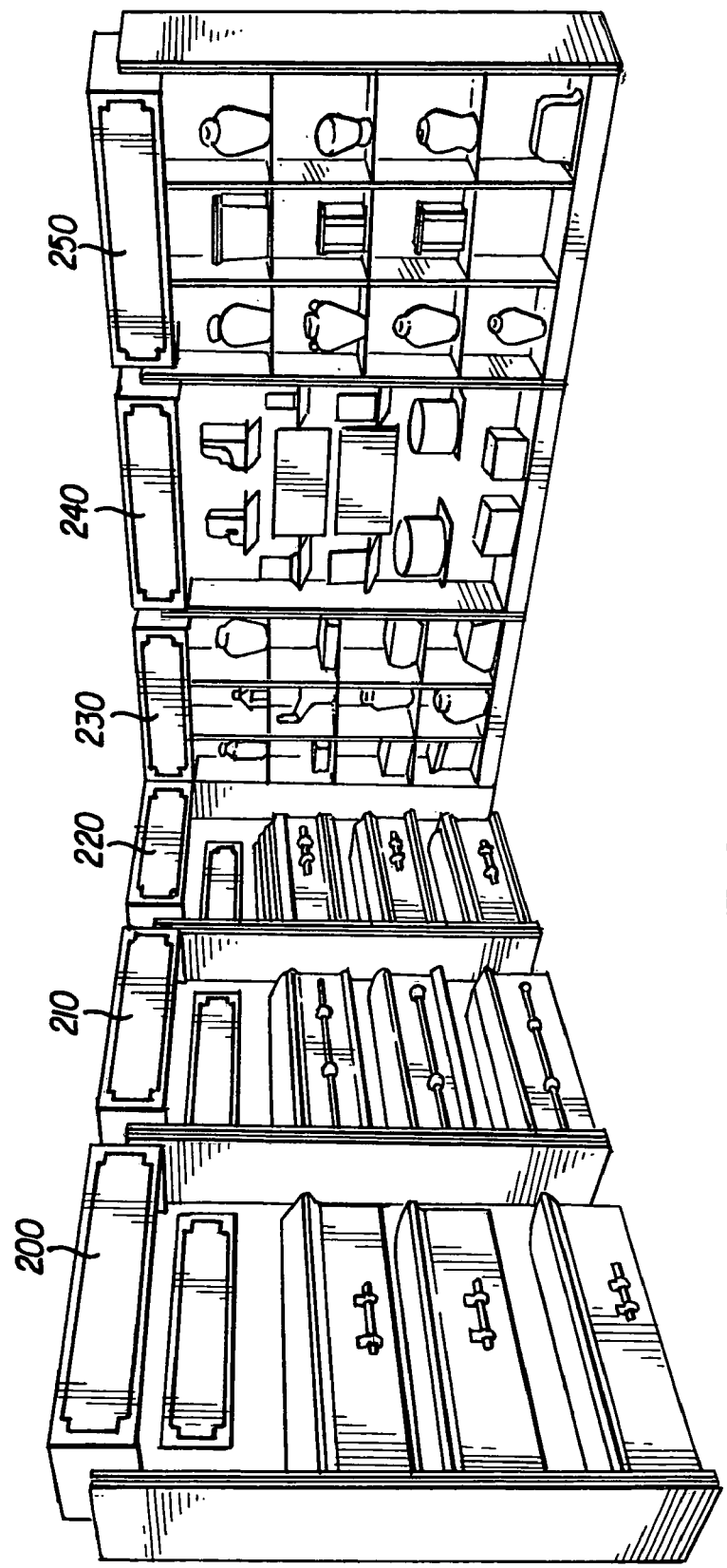
FIG. 14 demonstrates an alternative arrangement for cardboard, fiberwood and hardwood caskets in connection with other death care merchandising displays.

FIG. 13 illustrates a series of partial casket displays intended to be used for cremation services. Units 180, 182 and 184 display sectional caskets which are supported by shelving units, wherein the front of each shelving unit is provided with a display bracket. For example, in module 180, casket 181 is supported on shelf 183 having its front section provided with a card display 184. A similar arrangement may be made for the other sectional caskets illustrated in FIG. 13. FIG. 14 shows a partial arrangement for a death care display merchandising system having modules 200, 210, 220, 230, 240 and 250 for displaying, respectively, various grades of caskets meant for cremation; urns, memorabilia, and emblems and other funerary fixtures. FIG. 14 is illustrative of the fact that the modules may be assembled, not only linearly as in FIGS. 1 and 12, but also at an angular orientation as in FIG. 14.

Other shelving units which I have created to display death care merchandise can be found in FIGS. 18*a*, 18*b*, 22*a* and 22*b*. FIG. 18*a* is a transparent unit 260 provided with three brackets 261, 262, 263 to engage with a slat wall (not shown). Unit 260 has two open apertures 264, 265 into which can be placed various choices of casket interiors, for example, padding, lining, etc. Prior to the invention of this type of display, it had only been possible to provide such materials in drawers, which had to be extended to make this visible. The present shelving unit 260 permits them to be visible, even when the material is retracted within the apertures 264 and 265 and the material itself is much more visual to those persons perusing the merchandising system of the present invention.

In FIGS. 22*a* and 22*b*, I have provided a shelving unit 270 for holding relatively small items, such as cards, as in other embodiments brackets 271, 272 are provided to attach the shelf to a slat wall, e.g. 69 in module 60 shown in FIG. 5*a*. Shelf 270 has a small protrusion 273, 274 for orienting the rear wall of the shelf nearly vertical so as to exhibit the cards or other small items to the patron.

Figure 10:
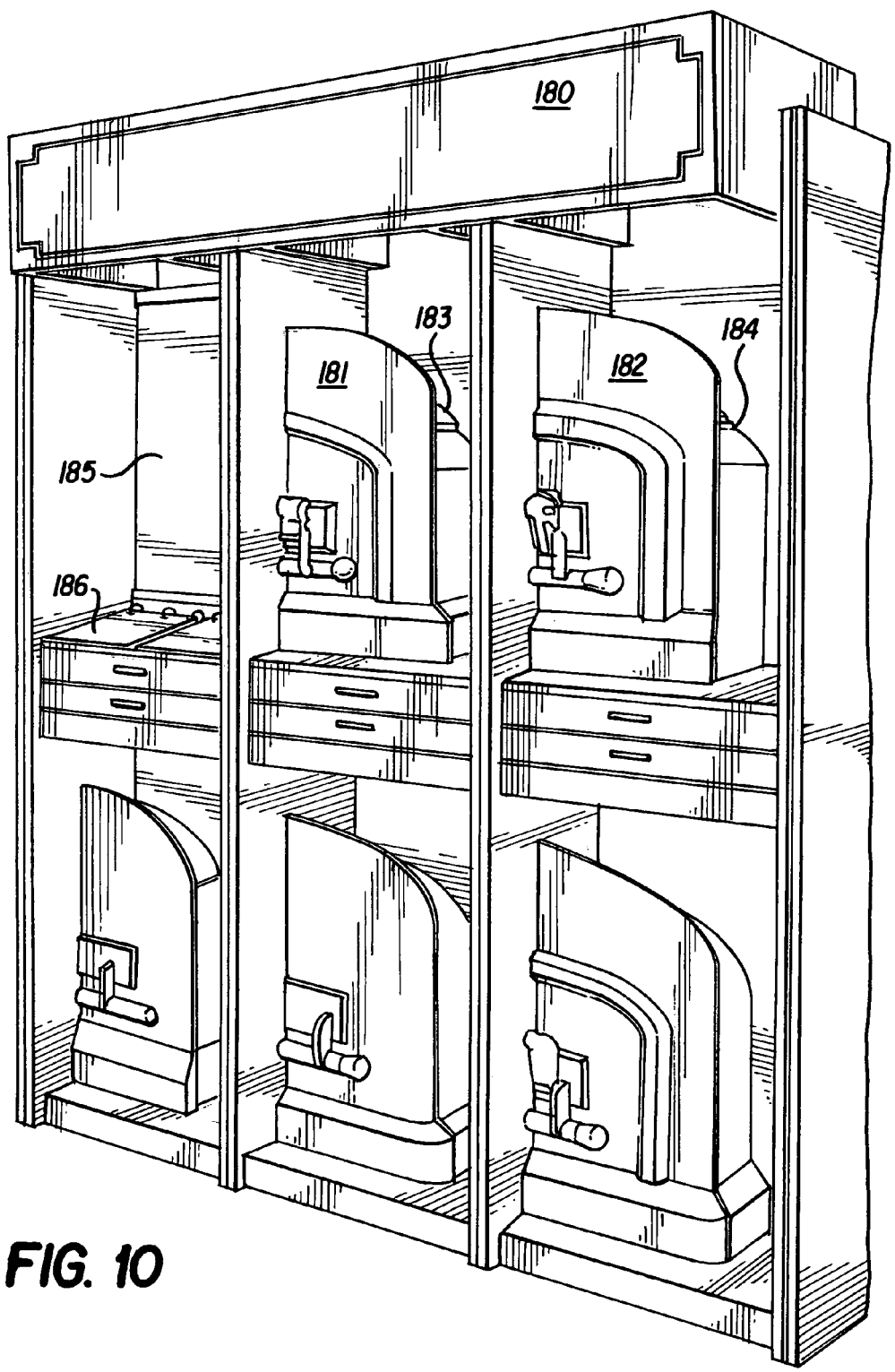
FIG. 10 is a perspective view of a metal vault module showing a cut away, partially sectioned view of a metal vault end, which is displayed in relation to an adjacent casket sectional portion.

By this invention, I have also provided a new method of exhibiting metal vaults. As is known to those skilled in the art, metal vaults are those devices which hold and protect a casket or coffin upon interment of the same within the earth. As caskets tend to deteriorate over time, the purpose of the metal vault is to hold the overburden of earth so as to prevent a sinking of the earth, as well as protecting the casket and its contents. As shown in FIG. 10, a module 180 illustrating several sectional vault ends 181, 182, etc. are provided. However, in module 180, sectional caskets 183, 184 or facsimiles thereof, are shown in relation to the vault thereby permitting the viewer to obtain a better understanding of the vault and its purpose, as well as the orientation of a casket within its respective vault. Informational literature, such as a poster 185 or binder 186 can be provided to inform the consumer of the purpose, types and costs of various vault features, as well as recommending the selection of a suitable metal vault to match or compliment the selected casket.

It is, thus, readily apparent that I have provided a novel death care merchandising system, which provides, for the first time, an integration between education, information, products and components for simultaneous viewing by a consumer contemplating either a pre-need or presently required funeral or memorial service.

I claim:

1. A method of merchandising both death care products and death care related products; said method comprising:
    (a) providing a plurality of similar modules, said modules being arranged in proximity to other similar modules;
    (b) displaying in at least one of the modules death care merchandise selected from the group consisting of caskets and coffins, miniatures thereof or sectional portions therof; and
    (c) displaying in at least one of said similar modules, death care related merchandise selected from the group consisting of printed materials, videotape or film, CD, DVD, videotape, keepsakes and floral arrangements.

2. The method of claim 1, wherein the printed matter includes cards, stationery, books, pamphlets and literature.

3. The method of claim 2, wherein the cards and stationery are displayed in one of said modules and the books, pamphlets and literature are displayed in another of said modules.

4. The method of claim 3, wherein at least one electronic media selected from the group consisting of videotapes, audiotapes, CD and DVD are displayed with modules which displays the books, pamphlets and literature.

5. The method of claim 1, including the step of providing a module in which only keepsakes are displayed.

6. The method of claim 1, including the step of providing a module for displaying information only, said information being in the form of books, brochures and visual printed or photographic material.

7. The method of claim 6, wherein the step of providing said module includes the step of providing a cabinet in said module to store additional copies of said books or brochures.

8. A death care merchandising system including a plurality of similar modules;
    at least one of the modules displaying death care merchandise selected from caskets and coffins, miniatures thereof or selections thereof;
    at least one other module for displaying death care related merchandise;
    at least one other module including plastic shelves or holders to display at least one item selected from the group consisting of printed materials, videotape or film, CD, DVD, audiotapes, keepsakes and floral arrangements.

9. The death care merchandising system of claim 8, further comprising a module only for displaying said keepsakes.

10. The death care merchandising system of claim 8, further comprising a module for displaying information only.

11. The death care merchandising system of claim 10, wherein said information is in the form of printed material, and polymeric shelves and a literature holder are provided in said module to hold said printed matter.

12. The death care merchandising system of claim 8, wherein at least one module is provided to contain a display of materials to personalize the interior or exterior of the casket or coffin.

13. The death care merchandising system of claim 12, wherein the materials to personalize include an emblem or casket corner, the modules further including a shelf and angular bracket to display said emblem or casket corner.

14. The death care merchandising system of claim 12, wherein the material to personalize is interior fabric for the casket or coffin, and the module includes a shelf for displaying, said fabric, said shelf comprising a protrusion extending for said shelf such that the shelf if angled away from said module.

15. The death care merchandise display system of claim 8, further including at least one shelf for display, or floral arrangement, said shelf having an aperture through said shelf.

16. The death care merchandise display system of claim 15, wherein said aperture is of a size and shape to receive at least one of a vase, an individual stem of a flower or an arrangement of stems of flowers.

17. A system of display shelves or holders, said display shelves or holders being formed of a polymeric material, the shelves or holders being configured so as to have at least one end insertable into slots in a slot wall, the shelves or holder also including at least one inwardly extending protrusion to engage the slot wall with the shelves or holder to be angled away from said slot wall.

18. The system of claim 17, wherein the polymeric material is transparent.

19. The system of claim 17, wherein at least one shelf is provided with a movable bookend section.

* * * * *